United States Patent [19]

Forsythe

[11] Patent Number: 4,695,469
[45] Date of Patent: * Sep. 22, 1987

[54] SHORTENING REPLACING AND FRESH SLICE IMPROVING AGENTS FOR YEAST-RAISED BAKERY PRODUCTS

[75] Inventor: Curtis J. Forsythe, Raytown, Mo.

[73] Assignee: Breddo, Inc., Kansas City, Kans.

[ * ] Notice: The portion of the term of this patent subsequent to Aug. 16, 2000 has been disclaimed.

[21] Appl. No.: 476,059

[22] Filed: Mar. 17, 1983

Related U.S. Application Data

[63] Continuation of Ser. No. 259,824, May 4, 1981, Pat. No. 4,399,155, which is a continuation-in-part of Ser. No. 962,011, Nov. 20, 1978, abandoned.

[51] Int. Cl.$^4$ ............................................. A21D 2/14
[52] U.S. Cl. .................................................... 426/24
[58] Field of Search .......................... 426/24, 552–554, 426/611, 653, 654; 252/356

[56] References Cited

PUBLICATIONS

Lee, application Ser. No. 443,668, filed 2/19/74, laid open to public inspection on 12/3/74.

Primary Examiner—Raymond N. Jones
Assistant Examiner—Celine T. Callahan
Attorney, Agent, or Firm—Litman, McMahon & Brown

[57] ABSTRACT

Agents and methods of use thereof for replacing the conventional triglyceridal shortening in yeast-raised bakery products, particularly pan breads, with resulting fresh slice characteristics which are at least acceptable comprise from about 2.5% to about 97.5% by weight succinylated monoglycides, or edible salt derivatives thereof, and a remainder portion of either sodium stearoyl lactylates, calcium stearoyl lactylates, lactylic stearate, or mixtures thereof. Preferably, the triglyceridal shortening of the bakery products is totally replaced by the agents in powdered form.

5 Claims, No Drawings

SHORTENING REPLACING AND FRESH SLICE IMPROVING AGENTS FOR YEAST-RAISED BAKERY PRODUCTS

CROSS-REFERENCE TO RELATED APPLICATIONS

The present application is a continuation of application for U.S. Pat. No. 259,824, entitled SHORTENING REPLACING AND FRESH SLICE IMPROVING AGENTS FOR YEAST-RAISED BAKERY PRODUCTS filed May 4, 1981, now U.S. Pat. No. 4,399,155, which was a continuation-in-part of application for U.S. Pat. No. 962,011, entitled SHORTENING REPLACING AGENTS FOR YEAST-RAISED BAKERY PRODUCTS filed Nov. 20, 1978, now abandoned.

BACKGROUND OF THE INVENTION

This invention relates to agents and method of using such agents for the replacement of conventional triglyceridal shortening in yeast-raised bakery products, especially pan breads, while maintaining acceptable fresh slice characteristics, and is particularly directed to powdered agents comprising from about 2.5% to about 97.5% by weight of succinylated monoglycerides or edible salts thereof and from about 2.5% to about 97.5% of a lactylate from a group consisting of sodium stearoyl lactylates, calcium stearoyl lactylates, lactylic stearate, and mixtures thereof.

In the preparation of yeast-raised bakery products, various liquid type triglycerides, commonly referred to as shortenings, are conventionally used to obtain a technically acceptable baked product. The levels of shortening required varies, depending upon the type of bakery product being produced and may range from 0.0% for French type breads up to 8.0% for buns. In general, however, for present day white pan breads the range is from about 2.0% to 5.0% by weight of flour used. Except fo a few minor varieties, such as the above mentioned French type breads, all conventional goods baked without shortening tend to be technically unacceptable from the standpoint of sliceability, freshness retention, loaf volume, crust color, crumb characteristics, mouth feel, taste and aroma.

The most common triglyceridal shortenings presently employed may be either plastic fats, liquid oils, or mixtures thereof, examples of which include lard, edible tallow, soybean oil, and partially hydrogenated soybean oil. These triglycerides are believed to aid in the retention of gas produced within the bread during the particularly soft and porous stages of baking. It is known in the art to employ other optional additives to bread compositions, such as stearoyl lactylates, distilled monoglycerides, mono-diglycerides, ethoxylated monodiglycerides and succinylated monoglycerides in conjunction with plastic shortenings to further improve the technical acceptability of the finished baked goods. In addition, the use of at least one of the above mentioned additives is mandatory when employing a liquid oil shortening in most conventional and in virtually all continuous type breads Attempts to totally replace shortening with other various compositions have generally resulted in technically unacceptable bread according to present day standards, especially with respect to fresh slice characteristics. Thus, it is well known to those versed in the art that although the additives consisting of sodium stearoyl lactylate, calcium stearoyl lactylate, lactylic stearate, and mixtures thereof, improve bread quality when used in conjunction with shortening, these same agents when used alone, even when used at the legal maximum level of 0.5% (by weight based upon total formula flour used), do not function well when employed at reduced or zero triglyceridal shortening levels. It is also known that succinylated monoglycerides do not function adequately as a total replacement for triglyceridal shortening, even when used at their legally restricted maximum usage level of 0.5% (by weight of flour used).

SUMMARY OF THE INVENTION

Shortenings comprising triglycerides have several handling disadvantages including inability to easily scale, pour in the case of plastic shortening and easily mix with other ingredients. Also triglycerides have a high caloric content. The basis for this invention, therefore is the surprising and unexpected discovery that there exists compositions comprising succinylated monoglycerides in combination with stearoyl lactylates, such that, when incorporated into the formula for yeast-raised bakery products, complete replacement of the triglyceridal shortening, whether plastic or liquid oil, can be achieved with a resulting yeast-raised bakery product which is technically acceptable both in general quality and in fresh slice characteristics. These compositions can exist in powdered and other free flowing particulate states. Furthermore, the resulting baked goods incorporating up to the maximum federally allowed limit of 0.5% (by weight of flour used) of the agents of the present invention exhibit at least equivalent and normally exhibit improved internal qualities such as grain, texture, crumb color, and crumb brightness, along with comparable loaf volume, improved freshness retention and especially sliceability when compared to equivalent baked goods containing up to 3.0% of a triglyceridal shortening alone. Even more surprising is the observation that the overall qualities of the resulting baked goods incorporating the agents of the present invention alone at 0.5% (by weight of flour used) are virtually equivalent to those goods containing the triglyceridal shortening in amounts up to 3.0% (by weight of flour used) along with other conventional optional additives, including the individual components of the present invention, at the maximum allowable limits thereof.

Evidence of the surprising function and usefulness of these total triglyceridal shortening replacing agents when powdered is made more apparent when it is considered that they are more conveniently and economically handled and scaled in a commercial bakery than are liquids, plastics, or hydrates. In addition, since in general as little as 0.5% (by weight of flour used) of the agents of the present invention will replace up to at least 3.0% (by weight of flour used) triglyceridal shortening as well as other various optional dough conditioning and/or crumb softening agents heretofor used with the shortening, it thus appears that the use of the agents of the present invention by commercial bakers would result in substantial savings, thus benefitting the consumer, by aiding in cost control of the finished baked goods. Another advantage which the consumer would realize is a substantial reduction in the caloric content of the baked goods with no loss in nutritional value.

The compositions of the agents comprise from about 2.5% to about 97.5% (by weight) of succinylated monoglycerides and edible salts thereof in combination with from about 2.5% to about 97.5% (by weight) of an ingredient selected from the group consisting of sodium stearoyl lactylate, calcium stearoyl lactylate, lactylic stearate, and mixtures thereof.

OBJECTS OF THE INVENTION

Therefor, the principal objects of the present invention are: to provide powdered agents which may replace the total triglyceridal shortening content f yeast-raised bakery products, particularly pan breads; to provide such agents which will produce yeast-raised bakery products having overall slicing and quality characteristics at least equal or superior to products produced without such agents and using only triglyceridal shortenings; to provide such agents which will produce yeast-raised bakery products which are essentially equivalent to those prepared with triglyceridal shortenings in combination with optional dough improving and/or crumb softening agents; to provide a method for using such agents in bakery products; to provide such agents which are comprised of compositions containing from about 2.5% to about 97.5% (by weight) of succinylated monoglycerides, together with either sodium stearoyl lactylate, calcium stearoyl lactylate, lactylic stearate, or mixtures thereof; and to provide such agents which can be powdered, are convenient to handle, economical to use and particularly well suited for the proposed use thereof.

Other objects and advantages of the present invention will become apparent from the following description wherein is set forth by way of example certain embodiments of the invention.

DESCRIPTION OF THE PREFERRED EMBODIMENT

As required, detailed embodiments and examples of the present invention are described herein. However, it is to be understood that the disclosed embodiments and examples are merely exemplary of the invention which may be embodied in other forms. Therefore, specific details disclosed herein are not to be interpreted as limiting but merely as a basis for the claims and as representative basis for teaching one skilled in the art to variously employ the present invention.

As used herein the term "agent" refers to a chemical composition encompassed by the present invention and functional in yeast-raised bakery products to partially or, preferably, totally replace shortening therein when used in appropriate quantities therein. The term "functional" as used herein refers to the ability of an agent of this invention to totally replace shortening in yeast-raised bakery products while still producing at least a comparable loaf volume, sliceability score and overall quality score therein.

In general this invention is a composition to be used as an agent in yeast-raised bakery products comprising a succinlyated monoglyceride, or edible derivative thereof, component in combination with a lactylic component. Appropriate lactylic components include sodium stearoyl lactylate, calcium stearoyl lactylate, and lactylic stearate, and in particular, sodium stearoyl-2-lactylate, calcium stearoyl-2-lactylate and mixtures thereof. These agents are suitable for powdering. In a preferred embodiment the powdered agent is used to totally replace triglyceridal shortening in such bakery products and consists essentially of the above described succinylated monoglyceride or derivative thereof and the lactylic component.

Both sodium and calcium stearoyl lactylates as items of commerce are controlled by the U.S. Food and Drug administration and the usage thereof in food products must conform to the specifications as set forth in the Food Additive Regulations 21 CFR Sections 172.846 and 172.844 respectively. Standardized yeast-raised breads, rolls, and buns must also conform to specifications as set out in 21 CFR Section 136.110 and in particular subsection C-15. Based upon the previously mentioned controls, the maximum total amount of sodium and/or calcium stearoyl lactylate as bread additives used in bakery products is currently limited to 0.5% of the total formula flour (that is, by weight of flour used).

As used herein, the terms sodium and calcium stearoyl lactylate refer to any item of commerce or laboratory preparation conforming to the above referenced specifications. Such stearoyl lactylate salts actually encompass a wide variety of lactylates including those having a substantial range of lactyl groups and various fatty acids taken from the acyl group. For example, the lactylate salts are generally written as sodium stearoyl-melactylate and calcium stearoyl n-lactylate, wherein m and n represent the average number of lactyl groups present, that is, each m and n represent an average range which may include lactylates having from 0.0 to 11.0 lactyl groups. Lactylates having more than five lactyl groups are usually not found in the most common items of commerce at a significant level, and are generally regarded as being nonfunctional in improving bread quality. Lactylates having one to three lactyl groups are considered most function, with an average of about two being preferred. In normal nomenclature, each m and n is rounded to the nearest whole number, hence, 2 may actually represent a range of from 1.51 to 2.49. As used herein a non-decimaled number, such as 2, references a range whereas a decimaled number, such as 2.0 would refer to a specific number of lactyl groups. In addition, commercial grade stearoyl lactylates may contain a wide range of acyl fatty acids, including those of C14 to C22, the most common of which are stearic and palmetic acids. Thus, for example, a particular stearoyl lactylate be made from a stearin fatty acid containing about 50.0% stearic acid and.50.0% palmetic acids. Therefore, the present invention is understood to include the range of lactyl groups and various fatty acid substitutions for stearic which may be present in commercial stearoyl lactylate salts.

The most common and the commercially used of the stearoyl lactylate salts is stearoyl-2-lactylate, methods of manufacture for the sodium and calcium salts thereof are well known, an example of which is given in the Tsen et al, U.S. Pat. No. 3,883,699. These lactylate salts are available under various commercial brands, such as "Emplex" and "Verv Ca", C. J. Patterson brands of sodium and calcium stearoyl-2-lactylate respectively, and "Top-Scor", Breddo Food Products brand of mixed salt sodium and calcium stearoyl-2-lactylate.

Lactylic stearate is prepared by admixing a stearoyl lactylate salt with mineral acid and separating the liberated lactylic stearate from the mixture thereof. Use of lactylic stearate is also controlled, as are the stearates above, by the U.S. Food and Drug Administration, for example see 21 CFR Section 172.848.

Succinylated monoglycerides as items of commerce and usage in food are also controlled by the U.S. Food and Drug Administration and must conform to the specifications as set forth in 21 CFR Section 172.830. Thus, as used herein, the term succinylated monoglyceride is understood to include all products conforming to the above referenced specifications and may contain fractions of different such monoglycerides or other types of monoglycerides as are found in commercial products. Succinylated monoglyceride as an item of commerce is produced, for example, by Distillation Products under the trade name Myverol SMG, and methods of manufacture are given in the Freund et al. U.S. Pat. No. 3,370,958, to As with the stearoyl lactylates, the maximum usage of succinylated monoglycerides in standardized yeast-raised bakery products is limited to 0.5% (by weight of flour used). The maximum total usage in bakery products of the agents of the present invention, being comprised of mixed compositions of succinylated monoglyceride and stearoyl lactylates, is also limited to 0.5% (by weight of flour used) as set forth in CFR 136.110, subsection C-15.

As used herein the term succinylated monoglycerides includes the various edible salt derivatives of the succinylated monoglycerides which may be used in place thereof. One such suitable derivative is sodium monoglyceridal succinate produced by neutralizing succinylated monoglyceride with sodium hydroxide.

The examples which follow will serve to illustrate the preparation of yeast-raised bakery products incorporating the agents of the present invention and the surprising benefits derived therefrom.

In general, the agents of the present invention comprise from about 2.5 parts to about 97.5 parts by weight of succinylated monoglyceride or an edible salt thereof and from about 2.5 parts to about 97.5 parts by weight of a stearoyl lactylate, especially from the group consisting of sodium stearoyl lactylate, calcium stearoyl lactylate or mixtures thereof. Preferably the agent is about 40 parts sodium stearoyl-2-lactylate, 40 parts calcium stearoyl-2-lactylate, 20 parts succinylated monoglyceride and having no parts of triglyceridal shortening and no other shortening replacing ingredients.

In use, the agents of the present invention are added to bread with the various ingredients thereof, either on the sponge or dough side. When no shortening is used in a bread formulation, any amount of the agent will begin to improve the quality thereof. The quality of bread having as little as 0.2% of the agent (by weight of flour used) begins to compare favorably with bread having as much as 3.0% fat shortening (by weight of flour used) in softness (as measured by compressibility) and overall quality. The quality measurements of loaf volume, sliceability, softness, and total overall quality all tend to improve as more of the agent up to the maximum allowable limit of 0.5% (by weight of flour used) is added to the bread ingredients, which are thereafter baked. It is foreseen that greater amounts than 0.5% (by weight of flour used) of the agents could be used, if the restrictions thereon, previously discussed, were raised.

EXAMPLE I

Sodium and calcium stearoyl-2-lactylates were prepared by admixing about 1.52 moles of polylactic acid and one equivalent of stearic acid in a molten state, thereby producing a stearoyl lactylic acid comparable to commercial grades of same, and neutralizing the acid with the appropriate amounts of sodium hydroxide or calcium hydroxide to produce sodium and calcium stearoyl lactylates respectively. Lactylic stearate was prepared by neutralizing a portion of the stearoyl-2-lactylate salts with mineral acid and recovering the liberated lactylic stearate.

A series of agents for use in yeast-raised bread containing stearoyl-2-lactylate salts and succinylated monoglyceride were then prepared by melting and mixing together amounts, as are shown in Table I, of the ingredients solidifying same, then grinding and sieving through a U.S. standard 70 mesh screen to obtain powdered compositions thereof.

The final powdered compositions obtained thereby are as follows:

The agents comprise a mixture or composition being in the nature of about 2.5% to about 97.5% succinylated monoglyceride or edible salts thereof and a remainder of sodium stearoyl lactylate, calcium stearoyl lactylate, lactylic stearate, or mixtures thereof. A preferred agent composition is 40% sodium stearoyl-2-lactylate, 40% calcium stearoyl-2-lactylate and 20% succinylated monoglyceride.

Preferably the agents of this invention are granulated or powdered thereby greatly improving the measuring and handling thereof, as contrasted with shortening which is conventionally plastic or in some instances liquid. The agents may be powdered or granulated by several well-known mthods including but not limited to: (a) comelting a mixture of the agent ingredients, allowing the mixture to cool until solidified, and mechanically grinding the solidified mixture; (b) producing particles by co-spraying the individually melted or comelted agent ingredients; or (c) co-hydrating a mixture of the agent ingredients and then freeze drying the mixture. The particular method used to granulate or powder the agent has not been found to significantly vary the characteristics thereof, as long as the ingredients themselves are not significantly chemically altered.

The method of use of the agents, is to incorporate the agent into conventional type yeast-raised bakery products in lieu of shortening. Although the agents can be used in conjunction with shortening, it has been found that improved overall quality is obtained if the agents totally replace the shortening. Amounts of agents from about 0.2% (by weight of flour used) up to the current maximum limit allowed by law of 0.5% (by weight of flour used) will effectively and functionally replace conventionally used quantities of shortening which is normally approximately 3.0% (by weight of flour used) if plastic and 2.0% if oil. Not only will the agent totally replace the shortening and produce bakery products having comparable slicing characteristics therewith, but significantly improve the overall quality score of the finished baked goods. This is especially surprising in that use of either the succinylated monoglycerides or stearoyl lactylates individually in equivalent quantities as compared to the agents, when used as total shortening replacements, produce baked products which are unacceptable insofar as slicing and overall quality characteristics are concerned. Other previously used shortening replacing agents also tend to have a deleterious effect on slicing scores as compared to triglyceridal shortenings. Thus, the succinylated monoglyceride and lactylic components of the present invention produce a synegistic effect, however, the reason for this effect is not understood. The agents may be added to either the sponge side or dough side ingredients when producing conventional type breads, or may be introduced at any convenient time during dough make up in continuous type breads.

TABLE I

Powdered Homogenous Compositions of Sodium and Calcium Stearoyl-2-Lactylates and Succinylated Monoglyceride

| Composition | Sodium Stearoyl-2 Lactylate (% by weight) | Calcium Stearoyl Lactylate (% by weight) | Succinylated Monoglyceride (% by weight) |
| --- | --- | --- | --- |
| A | 25.0 | 25.0 | 50 |
| B | 30.0 | 30.0 | 40 |
| C | 40.0 | 40.0 | 20 |
| D | 45.0 | 45.0 | 10 |
| E | 47.5 | 47.5 | 5 |
| F | 20.0 | 0.0 | 80 |
| G | 0.0 | 20.0 | 80 |

EXAMPLE II

Additional agents were prepared by melting and mixing together the quantities of the ingredients as shown in Table II, hydrating at 25% solids, freeze drying the resulting hydrates and sieving through a U.S. standard 60 mesh screen to obtain powdered compositions thereof.

The final compositions obtained are as follows:

TABLE II

Freeze Dried Hydrate Powdered Compositions of Stearoyl-2-Lactylates with Succinylated Monoglyceride

| Composition | Sodium Stearoyl-2 Lactylate (% by weight) | Calcium Stearoyl-2 Lactylate (% by weight) | Lactylic Stearate (% by weight) | Succinylated Monoglyceride (% by weight) |
| --- | --- | --- | --- | --- |
| H | 10.0 | 10.0 | 0 | 80 |
| I | 5.0 | 5.0 | 0 | 90 |
| J | 2.5 | 2.5 | 0 | 95 |
| K | 0.0 | 0.0 | 20 | 80 |

EXAMPLE III

A fully neutralized composition similar to H in Table II, was prepared by melting and mixing together the appropriate quantities of the ingredients, then neutralizing with the appropriate quantity of aqueous sodium hydroxide such that a fully neutralized 25% solids hydrate of stearoyl-2-lactylate salts and sodium monoglyceridal succinate was obtained. The hydrate was then freeze dried and powdered as in Example II and is shown in Table III.

TABLE III

Freeze Dried Hydrate Powdered Composition of Stearoyl-2-Lactylate Salts and Sodium Monoglyceridal Succinate

| Composition | Sodium Stearoyl-2 Lactylate (% by weight) | Calcium Stearoyl-2 Lactylate (% by weight) | Sodium Monoglyceridal Succinate (% by weight) |
| --- | --- | --- | --- |
| L | 10 | 10 | 80 |

Baking Results:

The basis for all of the following examples is a standard white bread formula having additions as so noted in the examples. The formula used was a conventional sponge-dough preparation as follows:

Sponge Side:

| | Parts by Weight |
| --- | --- |
| Patent Flour (14% moisture basis) | 245.0 |
| Baker Yeast | 17.5 |
| Arkady Yeast Food | 2.8 |
| Water | 300.0 |

Dough Side:

| | Parts by Weight |
| --- | --- |
| Patent Flour (14% moisture basis) | 245.0 |
| Sucrose | 28.0 |
| Cerelose | 14.0 |
| Shortening | Variable as so noted in examples |
| Water | 172.5 |

In each of the following examples, agents of this invention or other additives, when present, were added as powders to either the sponge side or dough side as so noted in the examples at a level of 0.5% by weight of total formula flour used (except Example IX wherein addition levels were varied).

The sponge ingredients were mixed at 80 degrees Fahrenheit (F) in a jacketed McDuffy bowl with an A-120 Hobart mixer and dough fork for one minute at #1 and #2 speeds respectively. The sponges were fermented four hours, then remixed with the dough side ingredients for one minute at #1 speed and seven minutes at #2 speed. The mixed doughs were given a 35 minute floor time, then divided and scaled at 18.5 ounces and mechanically rounded. After a 12 minute rest, the doughs were molded, panned, and proofed to onehalf inch above the pan tops, followed by baking for 20 minutes at 423 degrees F. in a Fisher reel oven.

The baked loaves were then handled in one of three ways, depending upon the type of test being run, as follows:

Test Group I. Loaf Volume and Total Quality Score

For this test all doughs, including variables and controls, were baked singularly. Each dough was divided, resulting in a total of two loaves for each test composition. After baking, the loaves were depanned and allowed to cool, then stored for 24 hours in sealed, air tight bags.

(a) Loaf Volume

This test consisted of a standard determination of loaf volume in the baking industry found by a volumetric measurement of rape seed displaced by the loaf. Increased loaf volume is considered desirable with a difference of 100 cubic centimeters (c.c.) being considered significant.

(b) Total Quality Score

This test was run on each loaf upon completion of test (a) above. Total quality was actually a composite score of many subtests evaluating major external and internal characteristics of the loaf. These subtests included the standard loaf volume measurement as described above along with subjective determinations of crust color, crust character, break and shred, crumb color, brightness, apparent softness, grain and texture, aroma, taste, eating quality, and cold sliceability. In this scoring system each factor was considered separately and penalized according to the degree of deviation from a hypothetical perfect loaf which would score 100. An acceptable commercial loaf will receive a minimum score of 90, with a score of 93 or greater considered excellent. This system is based essentially upon that promulgated by the American Institute of Baking and is comparable to the various methods presently used throughout the baking and milling industries. Changes of one-half point in the total quality score are considered to be significant.

Test Group II. Crumb Compressibility, Loaf Volume, and Total Quality Score

For this test all doughs, including variables and controls were baked in triplicate. Each dough was divided into two loaves during production, whereby a total of six loaves were produced for each composition.

Following baking, the loaves were depanned and allowed to cool undr controlled conditions, then stored at constant temperature for 48 hours in sealed air tight bags.

(a) Crumb Compressibility

This test measured the apparent crumb softness of the loaf and thus was a direct measurement of the effectiveness of the test compositions in retarding crumb staling rate thereof. This test was performed with a Universal Penetrometer which was fitted with a cylinder of standard diameter and weight. The cylinder was adjusted to just touch the surface of the bread being tested and then released for ten seconds. Penetration was measured in tenths of a millimeter (mm) to give the compressibility value. The higher the observed compressibility reading, the greater the apparent crumb softness. Each loaf was cut into five segments of approximately 2-inch thickness. The test was then performed on the front and back surfaces of each of the three middle segments, resulting in six separate measurements throughout each loaf such that there was a total of 36 separate compressibility measurements, the average of which was taken as the average compressibility of each composition being tested. A difference of 5 in the average compressibility was determined by statistical analysis to be significant under the conditions of the test. Higher compressibilities are considered desirable.

(b) Loaf Volume

As described under I(a) above.

Total Quality Score

As described under I(b) above, with the exception that the apparent crumb softness was based on measurement instead of subjective determination.

Test Group III. Fresh Sliceability Evaluation

For this test all doughs, including variables and controls, were produced singularly. Each dough was divided, resulting in a total of two loaves for each composition. After baking, the loaves were depanned and allowed to cool for approximately 30 minutes to an internal temperature of about 100 degrees F.

This condition approximates that found in a commercial bakery at the time the fresh bread is sliced.

The fresh loaves were then sliced and the apparent relative sliceability subjectively determined for each composition. Those compositions containing the agents of the present invention and no additional shortening were judged to be commercially acceptable if their apparent slicing characteristics were at least equivalent to the control composition containing either shortening alone or shortening in combination with optional dough improving and/or crumb softening agents.

EXAMPLE IV

Bread compositions, as specified in Table IV and using agents having the same composition as similar lettered agents in Table I, were prepared as previously described, evaluated as per Test Group I above, and the average results therefrom are tabulated in Table IV. Additives and shortenings, when used in the bread compositions of Table IV, were added to the dough side in the bread preparation.

TABLE IV

Overall Quality Scores and Loaf Volumes of White Bread Formulations Contaning Various Agents of the Present Invention as Compared to Various Controls

| Additive | Short-ening | % by Weight Flour Used Additive | Shortening | Average Loaf Volume (c.c.) | Average Total Quality Score |
|---|---|---|---|---|---|
| None | Lard (control) | 0.0 | 3 (dough) | 2675 | 90.0 |
| None | None (control) | 0.0 | 0 | 2588 | 88.0 |
| Agent A | None | 0.5 | 0 | 2700 | 93.0 |
| Agent B | None | 0.5 | 0 | 2650 | 92.5 |
| Agent C | None | 0.5 | 0 | 2713 | 94.0 |
| Agent D | None | 0.5 | 0 | 2750 | 92.5 |
| Agent E | None | 0.5 | 0 | 2675 | 92.0 |
| Agent F | None | 0.5 | 0 | 2688 | 93.5 |
| Agent G | None | 0.5 | 0 | 2675 | 93.5 |

It is ppparent from the above data that the control bread formulation contining neither shortening nor an agent of the invention did not produce commercially acceptable bread from the standpoint of loaf volume and overall quality score. Furthermore, the no shortening control bread was judged to be totally unacceptable in its freash slicing characteristics.

However, it would seem that Agents A through G of the invention, used at levels of 0.5% (by weight of the flour used), have successfully replaced 3.0% (by weight of flour used) lard in the bread formula, resulting in baked loaves which are not only technically acceptable but which are comparable in loaf volume and surprisingly superior in overall quality score.

All loaves containing Agents A through G of the invention were judged to have fresh slicing characteristics equivalent to or superior to the 3.0% lard control. Further, insofar as overall quality score is concerned, Agent C would appear to be a preferred agent of the invention, being a mixture of 40% by weight calcium stearoyl lactylate, 40% by weight sodium stearoyl lactylate and 20% by weight succinylated monoglyceride. By considering the results recorded in Table IV, it is seen that the functional agents of the invention include not only mixtures of both sodium and calcium stearoyl-2-lactylates in combination with succinylated monoglyceride but also the individual lactylate salts in combination with succinylated monoglyceride.

EXAMPLE V

In this example, white bread formulations were produced containing individual components of the agents of the invention used individually and baked with and without additional shortening. The shortening and/or additives, when used, were added to the dough side of the bread preparation. The bread compositons were tested according to Test group I above and various controls were included. Comparative fresh sliceability evaluations, as described in Test Group III above, were also run on each bread composition.

TABLE V

Comparable Loaf Volume and Overall Quality Scores of Breads Incorporating Agent C, Various Combinations of the Individual Components of Agent C and Shortenings, and Various Controls

| Additive | Shortening | % by Weight Flour Used Additive | % by Weight Flour Used Shortening | Average Loaf Volume (c.c.) | Average Total Quality Score |
|---|---|---|---|---|---|
| None | Lard (control) | 0.0 | 2.5 | 2775 | 90 |
| None | Soybean Oil (control) | 0.0 | 2.0 | 2713 | 90 |
| None | None (control) | 0.0 | 0.0 | 2600 | 88 |
| Sodium and Calcium Stearoyl-2-Lactylate in equal parts by weight | None | 0.5 | 0.0 | 2575 | 89 |
| Sodium and Calcium Stearoyl-2-Lactylate in equal parts by weight | Soybean Oil | 0.5 | 2.0 | 2638 | 91 |
| Succinylated Monoglyceride | None | 0.5 | 0.0 | 2613 | 90 |
| Succinylated Monoglyceride | Soybean Oil | 0.5 | 2.0 | 2688 | 91 |
| Agent C | None | 0.5 | 0.0 | 2700 | 93 |

It should be noted that bake results can only be compared between bake compositons and results made at the same time, thus the results of Agent C vary between Table IV and Table V. However, test results in each individual example are comparable.

As is seen from the data of Table V it appears that the bread formulation containing either 2.5% (by weight of flour used) lard or 2.0% soybean oil produced technically acceptable loaves which were each judged to have acceptable fresh slicing characteristics. Also, it is seen and totally expected to one versed in the art that the bread formulation containing 0.5% (by weight of flour used) stearoyl lactylate salts without succinylated monoglycerides and having no added shortening is not only technically unacceptable but is essentially the equivalent to the loaves produced from the same formulation containing neither the lactylate salts nor the shortening insofar as loaf volume and total quality score are concerned. Further, although the bread formulation containing 0.5% (by weight of flour used) succinylated monoglyceride alone, with no additional shortening, produced loaves which appear to be comparable to those obtained from the forulation containing 2.0% (by weight of flour used) soybean oil alone, these loaves were judged to be unacceptable insofar as fresh slicing characteristics were concerned.

Thus, the surprising function of the agents of the invention is further demonstrated in that Agent C, which contains 80.0% by weight stearoyl lactylate salts and 20.0% by weight succinylated monoglyceride in combination and incorporated at a level of 0.5% (by weight of flour used) with no additional shortening, has not only successfully replaced the total formula shortening, which 0.5% (by weight of flour used) of either individual component of Agent C alone was not able to do, but has also resulted in baked loaves which are superior in total quality score and judged to have superior fresh slicing characteristics as compared to either the shortening controls or those formulations containing shortening and 0.5% (by weight of flour used) of either the stearoyl lactylate salts or the succinylated monoglyceride.

EXAMPLE VI

In this example additional compositions of stearoyl lactylates and succinylated monoglyceride were evaluated in white bread formulations and compared to appropriate controls as tabulated in Table VI. Each bread sample was tested, as described in Test Group I above. The additives or shortening when added, were included in the dough side. The agents have the same ingredients as similarily lettered compositions in Table II.

TABLE VI

Loaf Volumes and Overall Quality of Breads Incorporating Various Agents of the Invention

| Additive | Shortening | % by Weight Flour Used Additive | % by Weight Flour Used Shortening | Average Loaf Volume (c.c.) | Average Total Quality Score |
|---|---|---|---|---|---|
| None | Lard (control) | 0.0 | 3.0 | 2675 | 90.0 |
| Agent H | None | 0.5 | 0.0 | 2700 | 92.0 |
| Agent I | None | 0.5 | 0.0 | 2650 | 92.5 |
| Agent J | None | 0.5 | 0.0 | 2838 | 92.0 |
| Agent K | None | 0.5 | 0.0 | 2700 | 93.0 |
| Agent L | None | 0.5 | 0.0 | 2788 | 92.5 |

The data show the total shortening replacing ability of agents H through L without loss of quality within the final bread product. Although use of Agent J in bread resulted in loaves having excellent volume and improved total quality scores, the fresh slicing charcteristics thereof were judged to be marginal, The fresh slicing characteristics of the remaining agents were improved as compared to the control.

It should also be noted that agent L, which is a mixture of stearoyl lactylate salts and the sodium salt of succinylated monoglyceride, as well as agent K, which is a mixture of succinylated monoglyceride and free lactylic stearate, are also functional in their shortening replacing abilities. Thus, it is demonstrated that agents of these types also fall under the purview of the present invention.

EXAMPLE VII

In this example the effect of dough side addition as compared to sponge side addition upon crumb softening, loaf volume, and total quality score of various agents of the invention incorporated into the bread ingredients with and without triglyceridal shortening were investigated as per Test Group II, and compared to control loaves containing 2.0% (by weight of flour used) soybean oil. The results are tabulated in Table VII.

TABLE VII

Quality Results of Agents Incorporated With And Without Conventional Shortening in Bread as Compared to a Control Sample and with Variations in Addition Point

| Additive | Shortening | Additive | Shortening | (mm × 10) | (c.c.) | Score |
|---|---|---|---|---|---|---|
| None | Soybean Oil (control) | 0.0 | 2.0 (dough) | 139 | 2538 | 89.0 |
| Agent B | None | 0.5 (dough) | 0.0 | 163 | 2771 | 94.0 |
| Agent B | Soybean Oil | 0.5 (dough) | 2.0 (dough) | 184 | 2725 | 92.5 |
| Agent B | None | 0.5 (sponge) | 0.0 | 205 | 2696 | 95.0 |
| Agent A | None | 0.5 (dough) | 0.0 | 166 | 2750 | 92.0 |
| Agent A | Soybean Oil | 0.5 (dough) | 2.0 (dough) | 193 | 2700 | 91.5 |

From the data of Table VII it is apparent that the agents of the invention when added to either the dough or sponge produce loaves which are greatly superior in all respects to those containing 2.0% soybean oil only. It is further apparent that the agents of the invention when added to the dough side without additional shortening produce loaves which are equivalent or superior (the fresh slicing characteristics were also judged to be superior) to those produced with the agents plus added shortening, with the exception of crumb softness, as measured by compressibility. It would appear that while a highly significant degree of crumb softening does result when the agents of the invention are used alone on the dough side, the resulting average compressibilities appear to be on the order of 20 to 30 points less than when the same agents are added to the dough side in combination with additional shortening. However, it is seen that when Agent B is used alone on the sponge side, the resulting average crumb compressibility increases by about 40 units as compared to the dough side addition, and by about 20 units as compared to the dough side addition in combination with additional shortening, while loaf volumes are comparable and overall quality scores are greatly improved.

Thus, it is demonstrated that while the agents of the invention, when used as complete shortening replacers and added to the dough ingredients, result in a highly significant increase in the average compressibilities, as compared to a shortening control, a much greater benefit is obtained by sponge side addition and thus would appear to be the preferred method of addition to conventional sponge-dough type yeast raised bakery product formulations.

It has further been demonstrated that the agents of the invention not only function for their intended purpose as complete triglyceridal shortening replacers, but also function better than or at least statistically equal in their overall quality improving abilities when there is an absence of triglyceridal shortening therein (with the noted exception of crumb softening as measured by compressibility effects when both are added to the dough side, in which case the crumb softening is still improved over the shortening control).

EXAMPLE VIII

In this example the fresh slicing characteristics of fresh bread incorporating an agent having the same ingredients as agent C as shown in Table I was produced with a formulation both with and without added triglyceridal shortening and compared to various controls, as shown in Table VIII. Each loaf produced was tested according to Test Group III above. Loaves receiving fresh slicing scores above three are considered to have good slicing characteristics which are acceptable in a commercial bakery. The shortening and/or additives when used, were added to the dough side of the bread formulation.

TABLE VIII

Slicing Characteristics of Breads Incorporating the Agents and Various Controls

| Additive | Shortening | % by Weight of Flour Used Additive | Shortening | Fresh Slicing Score |
|---|---|---|---|---|
| None | Lard (control) | 0.0 | 3.0 | 4.5 |
| None | Soybean Oil (control) | 0.0 | 2.0 | 4.0 |
| Agent C | None | 0.5 | 0.0 | 5.0 |
| Agent C | Soybean Oil | 0.5 | 2.0 | 3.0 |
| Comelted mixture of sodium and calcium stearoyl lactylate having an equivalency weight ratio of 1:1 | Soybean Oil (control) | 0.5 | 2.0 | 3.5 |

The data of Table VIII demonstrate that white bread formulations containing the agents of the invention incorporated into the bread formulations at 0.5% (by weight of flour used) as complete triglyceridal shortening replacements, produce loaves which have fresh slicing characteristics which are equivalent to or superior than those fresh loaves produced from formulations containing 3.0% lard, 2.0% soybean oil, 2.0% soybean oil in combination with 0.5% of Agent C, or 2.0% soybean oil in combination with a mixture of sodium and calcium stearoyl-2-lactylates (wherein each percentage is by weight of flour used).

Even more surprising is the apparent demonstration that the co-use of triglyceridal shortening in combination with the agent of the invention or with a stearoyl lactylate mixture without succinylated monoglycerides not only does not result in improved fresh slicing characteristics, but actually appears to be deleterious to the fresh slicing quality thereof.

EXAMPLE IX

In order to test the lower functional range of the agents, bread compositions were produced using shortening and additives as are specified in Table IX. The agents have the same ingredients as those described in Table I and identified by similar letters. All additives and shortening, when used, were added to the dough side in the preparation of the bread. Test group II was run on each resulting bread.

TABLE IX

Overall Quality, Loaf Volume, and Compressibility of Bread Containing Various Amounts of Agent C as Compared to Controls

| Additive | Shortening | % by weight of Flour Used Additive | Shortening | Average Loaf Volume (c.c.) | Average Compressibility (mm × 10) | Total Quality Score |
|---|---|---|---|---|---|---|
| None | Lard (control) | 0.0 | 3.0 | 2779 | 125 | 90 |
| None | None (control) | 0.0 | 0.0 | 2554 | 122 | 88 |
| Agent C | None | 0.5 | 0.0 | 2688 | 167 | 94 |
| Agent C | None | 0.3 | 0.0 | 2675 | 149 | 92 |
| Agent C | None | 0.1 | 0.0 | 2688 | 134 | 89 |

An inspection of the data of Table IX discloses that levels as low as 0.1% (by weight of flour used) of the compositions of the present invention improve loaf volume, softness as measured by compressibility, and total quality over a bread containing no shortening or other additive, however, the bread using 0.1% (by weight of flour used) of Agent C, while comparable in loaf volume and softness to a control using triglyceridal shortening, was not acceptable on total quality as compared with the shortening control.

At the 0.3% (by weight of flour used) level of Agent C, the overall quality was substantially improved over the triglyceridal shortening control, however, fresh slicing characteristics of the bread with 0.3% of Agent C were found to be marginal with respect to the control samples using lard. Use of Agent C at the level of 0.3% produced technically acceptable bread which was superior to all controls in softness and overall quality.

Bread having 0.5% of Agent C was improved over the controls in all respects except loaf volume (loaf volume was comparable to the lard control and improved over the control with no shortening or additives).

It would appear that the addition of any amount of one of the agents of the invention to bread would improve all quality aspects thereof, in comparison to bread incorporating no shortening.

By extrapolation of the data of Table IX, it is found that addition of amounts of Agent C approximating 0.2% (by weight of flour used) would compare favorably in loaf volume, softness, and overall quality with triglyceridal shortening. Amounts of Agent C greater than 0.5% (by weight of flour used) would also be functional herein, but this upper range limit has been chosen for the examples, because it is the maximum allowable addition rate currently allowed by the Federal Drug Administration in bread compositions.

Although powdered and granular agents of this invention have been described herein because of their ease of handling, it is foreseen that these gents could be used in other forms such as hydrated, plasticized with oil or other triglycerides, or placticized and then hydrated.

Each of the succeeding experiments employed the following procedure in all evaluations.

Standard white bread formula, 2.5% yeast, lard when used, 3%, and 67.5% base absorption adjusted upward by 2% when lard was eliminated from the formula. Lard when used and all agents were added to the dough side. The fresh slicng scores, handling properties of the dough throgh the machinery and overall quality of the baked loaves were all subjective evaluations by the baker.

The following fresh slicing scoring system was employed:

5—Very good
4—Good
3—Fair, but acceptable
2—Poor—unacceptable
1—Very poor—impossible Each experiment was based upon duplicate loaves, placed on racks after baking and allowed to cool to an average internal temperature of 105 degrees F. Each loaf was then placed in a miter box and hand sliced with a sharp knife into three two inch thick inside pieces plus two end pieces. Thus, each loaf exhibited 8 surfaces for judging, or a total of 16 surfaces per experiment. The subjective fresh slicing score thus arrived for each experiment was, therefore, based upon the amount of tearing and/or balling of the warm fresh crumb as compared to the fresh slicing control. The slicing knife was periodically stropped to maintain its straight keen edge.

Under commercial bakery condition, the normal internal temperature at which the bread goes to the slicer is about 100 to 110 degrees F. Thus, upon this basis and the data of Tabel I 105 degrees F. was chosen as the fresh slicing temperature for the subsequent evaluations.

Also, the following abbreviations or terms are utilized in the following example:

GMS—90—20% solids hydrate of distilled monoglyceride
SMG—succinilated monoglyceride
Tween 60—polyoxyethylene-20-sorbitan monostearate
SSL—sodium stearoyl-2-lactylate
CSL—calcium stearoyl-2-lactylate
EMG—polyoxyethylene-20-monodiglyceride.

TABLE X

Fresh Slicing Temperature Series of Acceptability

| Hand Slicing Score | Variable | Slicing Temp. Deg. F. | Dough Handling Through Machinery | Overall Bread Quality |
|---|---|---|---|---|
| 5 | 3% lard + 1% (GMS-90) | 85 | Good | Good |
| 5 | 3% lard + 1% (GMS-90) | 90 | " | " |
| 5 | 3% lard + 1% (GMS-90) | 100 | " | " |
| 4 | 3% lard + 1% (GMS-90) | 105 | " | " |
| 3 | 3% lard + 1% (GMS-90) | 115 | " | " |
| 5 | No Lard + 2% (GMS-90) | 90 | Marginal | Unacceptable |
| 4 | No Lard + 2% (GMS-90) | 100 | " | " |
| 2.5 | No Lard + | 105 | " | " |

TABLE X-continued

Fresh Slicing Temperature Series of Acceptability

| Hand Slicing Score | Variable | Slicing Temp. Deg. F. | Dough Handling Through Machinery | Overall Bread Quality |
|---|---|---|---|---|
| 1 | 2% (GMS-90) No Lard + | 110 | " | " |
| 4.5 | 2% (GMS-90) 3% Lard + No (GMS-90) | 105 | Good | Good |

Various surfactants of the type which are sometimes suggested as shortening replacing agents were tested for dough handling, overall baking quality and fresh slicing quality (hand slicing score) to determine if same will perform according to the called for compositions of the present invention in both producing acceptable overall baking quality and at least marginal fresh slicing characteristics when used without shortening. Individual ingredients of the agents of the present invention were also tested. The results are given in Table XI.

TABLE XI

Fresh Slicing Evaluation of Various Surfactants With and Without Added Lard

| Hand Slicing Score | Variable | Dough Handling Through Machinery | Overall Baked Quality |
|---|---|---|---|
| 4.0 | 0.5% SMG + 3% Lard | Good | Good |
| 4.5 | 0.5% Tween 60 + 3% Lard | " | " |
| 3.0 | 0.5% EMG + 3% Lard | " | " |
| 2.0 | 0.5% SSL + 3% Lard | " | " |
| 3.5 | 0.5% CSL + 3% Lard | " | " |
| 4.0 | Slicing Control | Good | Good |
| 2.5 | 0.5% SMG + 0 Lard | Poor | Unacceptable |
| 2.5 | 0.5% Tween 60 + 0 Lard | " | " |
| 2.5 | 0.5% EMG + 0 Lard | " | Marginal |
| 1.0 | 0.5% SSL + 0 Lard | " | Unacceptable |
| 2.5 | 0.5% CSL + 0 Lard | " | " |

The above data clearly illustrate that with the exception of EMG, all of the above agents used without triglyceridal shortening produced baked loaves which were unacceptable in overall quality as well as dough handling and are borderline to unacceptable insofar as the fresh slicing characteristics are concerned.

Additional tests were made to determine the functionality of various combinations of the ingredients studied and described in Table XI for ability to replace shortening as determined by fresh slicing scores and overall quality. The results are given in Table XII.

TABLE XII

Fresh Slicing Evaluation of Various Surfactant Combinations With and Without Added Lard

| Hand Slicing Score | Variable | Dough Handling Through Machinery | Overall Baked Quality |
|---|---|---|---|
| 4 | Slicing Control | Good | Good |
| 4 | 0.25% SMG + 0.25% Tween 60 + 3% Lard | " | " |
| 4 | 0.25% SMG + 0.25% EMG + 3% Lard | " | " |
| 3.5 | 0.25% EMG + 0.25% Tween 60 + 3% Lard | " | " |
| 3.5 | 0.25% EMG + 0.25% SSL + 3% Lard | " | " |
| 3.0 | 0.25% SSL + 0.25% Tween 60 + 3% Lard | " | " |
| 3.0 | 0.25% CSL + 0.25% EMG + 3% Lard | " | " |
| 3.5 | 0.25% CSL + 0.25% Tween 60 + 3% Lard | " | " |
| 4.0 | Slicing Control | " | " |
| 2.5 | 0.25% SMG + 0.25% Tween 60 + 0 Lard | Marginal | Unacceptable |
| 2.0 | 0.25% SMG + 0.25% EMG + 0 Lard | Acceptable | " |
| 2.5 | 0.25% EMG + 0.25% Tween 60 + 0 Lard | " | " |
| 1.0 | 0.25% EMG + 0.25% SSL + 0 Lard | " | " |
| 1.0 | 0.25% SSL + 0.25% Tween 60 + 0 Lard | Marginal | " |
| 1.0 | 0.25% CSL + 0.25% EMG + 0 Lard | Acceptable | " |
| 2.0 | 0.25% CSL + 0.25% Tween 60 + 0 Lard | Marginal | " |

Thus, the above clearly demonstrates that the same results are obtained when the above combination agents are used without triglyceridal shortening. That is each of the combinations with lard produces unacceptable overall quality and slicing quality.

Additional tests were made to determine the limits of the ranges of the agents of the present invention as a function of ingredients. The results are given in Table XIII.

TABLE XIII

Fresh Slicing Evaluations of Lactylates in Combination With SMG With and Without Added Lard

| Hand Slicing Score | Variable | Dough Handling Through Machinery | Overall Baked Quality |
|---|---|---|---|
| 4.0 | Slicing Control | Good | Good |
| 4.0 | 0.5% of (2.5% SSL + 97.5% SMG) + 3% Lard | " | " |
| 3.0 | 0.5% of (2.5% SSL + 97.5% SMG) + 0% Lard | Acceptable | Marginal |
| 4.0 | 0.5% of (2.5% CSL + 97.5% SMG) + 3% Lard | Good | Good |
| 3.5 | 0.5% of (2.5% CSL + 97.5% SMG) + 0% Lard | Marginal | Marginal |
| 2.5 | 0.5% of (97.5% SSL + 2.5% SMG) + 3% Lard | Good | Good |
| 2.5 | 0.5% of (97.5% SSL + 2.5% SMG) + 0% Lard | Marginal | Acceptable |
| 3.5 | 0.5% of (97.5% CSL + 2.5% SMG) + 3% Lard | Good | Good |
| 2.5 | 0.5% of (97.5% CSL + 2.5% SMG) + 0% Lard | Acceptable | Marginal |

TABLE XIII-continued
Fresh Slicing Evaluations of Lactylates in Combination With SMG With and Without Added Lard

| Hand Slicing Score | Variable | Dough Handling Through Machinery | Overall Baked Quality |
|---|---|---|---|
| 3.0 | 0.5% of (80% SSL + 20% SMG) + 3% Lard | Good | Good |
| 3.5 | 0.5% of (80% SSL + 20% SMG) + 0% Lard | Acceptable | Good |
| 4.0 | Slicing Control | Good | Good |
| 3.5 | 0.5% of (80% CSL + 20% SMG) + 3% Lard | Good | Good |
| 3.0 | 0.5% of (80% CSL + 20% SMG) + 0% Lard | Acceptable | Good |
| 4.5 | 0.5% of (1.25% SSL + 1.25% CSL + 97.5% Smg) + 3% Lard | Good | Good |
| 4.0 | 0.5% of (1.25% SSL + 1.25% CSL + 97.5% Smg) + 0% Lard | Marginal | Unacceptable |
| 4.0 | 0.5% of (48.75% SSl + 48.75% CSL + 2.5% SMG + 3% Lard | Good | Good |
| 3.0 | 0.5% of (48.75% SSl + 48.75% CSL + 2.5% SMG + 3% Lard | Marginal | Marginal |
| 4.0 | 0.5% of (40% CSL + 40% CSL + 20% SMG) + 3% Lard | Good | Good |
| 3.0 | 0.5% of (40% CSL + 40% CSL + 20% SMG) + 0% Lard | Acceptable | Good |
| 3.0 | 0.5% of (45% SSL + 45% CSL + 10% SMG) + 3% Lard | Acceptable | Good |
| 3.0 | 0.5% of (45% SSL + 45% CSL + 10% SMG) + 0% Lard | Acceptable | Good |

In general, the above data demonstrate that in the called for range of the agents of the present invention, that is, between 97.5% succinylated monoglyceride to 2.5% lactylate and 97.5% lactylate to 2.5% succinylated monoglyceride (each by weight), the fresh slicing characteristics of the baked loaves range from fair to marginal, while the overall quality normally ranges from good to marginal. In addition, in the intermediate ratios, the fresh slicing characteristics range from fair to marginal, whereas the overall quality is good in every case. It is noted that at the lowest limits of the called for range, the quality begins to show the deterioration expected when going to individual ingredients as shown in Table XI.

There does appear to be some anomalies in the fresh slicing scores of the preferred ranges and the limiting ranges of the above agents. However, this can in part be attributed to the fact that in some cases loaves of overall poor quality having low volumes and a dense open crumb structure will subjectively appear to slice better than ones of good quality having large volumes with a correspondingly less dense and finer crumb structure.

It is to be understood that while certain forms of this invention have been described, it is not intended to be limited thereto, except insofar as such limitations as are included in the claims.

Having thus described the invention, what is claimed and desired to be secured by Letters Patent is:

1. A method of improving fresh slicing characteristics of yeast-raised bakery products; said products being substantially free of triglyceridal shortening; said method comprising the steps of:
   (a) producing a composition comprising succinylated monoglycerides and a lactylic component selected from the group consisting of sodium stearoyl-2-lactylate, calcium stearoyl-2-lactylate, lactylic stearate, and mixtures thereof; wherein
   (b) said composition contains an amount of said succinylated monoglycerides in a range of about 5 to about 95 parts by weight and an amount of said lactylic component in a range of about 5 to about 95 parts by weight; and further
   (c) after producing said composition incorporating said composition into the ingredients including flour and yeast of said bakery product prior to baking; wherein
   (d) said composition is included in said bakery products in an amount within a range from about 0.3% to about 0.5% by weight of said flour; and
   (e) baking said ingredients of said bakery products without inclusion of substantial amounts of triglyceridal shortening into said bakery products.

2. The method according to claim 1 wherein:
   (a) said lactylic component is a mixture of sodium stearoyl-2-lactylate and calcium stearoyl-2-lactylate.

3. In combination with the ingredients of yeast-raised bakery products, including flour and yeast, an agent for improving fresh slicing characteristics of said products without triglyceridal shortening; said agent comprising a powdered mixture including:
   (a) a first component selected from the class consisting of succinylated monoglyceride, sodium monoglyceridal succinate, and mixtures thereof in an amount from about 2.5% to about 97.5% by weight of said mixture; and
   (b) a second component selected from the class consisting of sodium stearoyl-2-lactylate, calcium stearoyl-2-lactylate, lactylic stearate and mixtures thereof in an amount from about 2.5% to about 97.5% by weight of said mixture such that said first and second components combine to form 100% of said mixture;
   (c) said agent included with said ingredients in an amount within a range from about 0.3% to about 0.5% by weight of said flour as required to produce acceptable fresh slice characteristics in said bakery products;
   (d) whereby said bakery products have acceptable fresh slicing characteristics.

4. The combination of claim 3 wherein:
   (a) said first component is succinylated monoglyceride;
   (b) said second component is a mixture of sodium stearoyl-2-lactylate and calcium stearoyl-2-lactylate.

5. The combination of claim 3 wherein:
   (a) said first component is succinylated monoglyceride;
   (b) said second component is a mixture of about half by weight of sodium stearoyl-2-lactylate and half by weight of calcium stearoyl-2-lactylate; and
   (c) there are approximately 20 parts by weight of said first component for each 80 parts by weight of said second component.

* * * * *